United States Patent
Toyoda et al.

(10) Patent No.: US 7,910,513 B2
(45) Date of Patent: Mar. 22, 2011

(54) PHOTOCATALYST SHEET AND METHODS OF WELDING AND MANUFACTURING THE SAME

(75) Inventors: Hiroshi Toyoda, Osaka (JP); Kazuhiro Abe, Osaka (JP); Takayuki Nakata, Osaka (JP)

(73) Assignee: Taiyo Kogyo Corporation, Osaka-shi (JP)

( * ) Notice: Subject to any disclaimer, the term of this patent is extended or adjusted under 35 U.S.C. 154(b) by 584 days.

(21) Appl. No.: 10/583,779

(22) PCT Filed: Dec. 10, 2004

(86) PCT No.: PCT/JP2004/018854
§ 371 (c)(1),
(2), (4) Date: Jun. 21, 2006

(87) PCT Pub. No.: WO2005/063392
PCT Pub. Date: Jul. 14, 2005

(65) Prior Publication Data
US 2007/0148424 A1     Jun. 28, 2007

(30) Foreign Application Priority Data
Dec. 25, 2003     (JP) .................................. 2003-429627

(51) Int. Cl.
*B23B 5/16*     (2006.01)
(52) U.S. Cl. ............................ 502/208; 428/57; 428/144
(58) Field of Classification Search .................. 502/208; 428/57, 144
See application file for complete search history.

(56) References Cited

U.S. PATENT DOCUMENTS
6,180,548 B1 *   1/2001   Taoda et al. .................... 501/137

FOREIGN PATENT DOCUMENTS
| JP | 10-237769 A | 9/1998 |
| JP | 10-244166 A | 9/1998 |
| JP | 11-267519 A | 10/1999 |
| JP | 11-300833 A | 11/1999 |

(Continued)

OTHER PUBLICATIONS

International Search Report of PCT/JP2004/018854, date of mailing Apr. 19, 2005.

(Continued)

*Primary Examiner* — Jessica L Ward
*Assistant Examiner* — Nicholas P D'Aniello
(74) *Attorney, Agent, or Firm* — Westerman, Hattori, Daniels & Adrian, LLP

(57) ABSTRACT

The present invention provides the photocatalyst sheet and the methods of welding and manufacturing the same, by which the substrate and resin of the photocatalyst-containing layer are not decomposed by photocatalyst particles, mutual welding of sheets is easy, and the photo-redox effect of a photocatalyst can be obtained. A photocatalyst sheet (1b) comprises a substrate (2) such as fiber and coated layers (3) on both sides of the substrate (2), and the coated layer (3) constitutes the photocatalyst-containing layer in which apatite-coated photocatalyst particles (4) are dispersed and fixed with resin. Here, the coated photocatalyst particles (4) on the surface of the photocatalyst-containing layer are so fixed as to have the parts exposed from the surface of the photocatalyst-containing layer. In case that photocatalyst sheets (1b) are mutually welded, the photocatalyst-containing layer of each photocatalyst sheet (1b) is not removed, and its surface is mutually held, and welded together by thermal welding or others.

8 Claims, 7 Drawing Sheets

FOREIGN PATENT DOCUMENTS

| | | |
|---|---|---|
| JP | 2000-001631 A | 1/2000 |
| JP | 2000-119957 A | 4/2000 |
| JP | 2002-096434 A | 4/2002 |
| JP | 2002-178434 A | 6/2002 |
| JP | 2002-201567 A | 7/2002 |
| JP | 2002-225205 A | 8/2002 |
| JP | 2002-282703 * | 10/2002 |
| JP | 2002-282703 A | 10/2002 |
| JP | 2002322369 A * | 11/2002 |
| JP | 2003-321313 A | 11/2003 |
| WO | WO 01/17680 A | 3/2001 |

OTHER PUBLICATIONS

International Preliminary Report on Patentability for Application No. PCT/JP2004/018854 mailed Jun. 28, 2007 (Form PCT/IB/338 and Form PCT/IPEA/409).

* cited by examiner

FIG. 6

| | Sample | Solution | Species of photocatalyst | (PVC+PMA)/ photocatalyst | Evaluation 1 (Silver Nitrate) | | Evaluation 2 | Evaluation 3 | | | |
|---|---|---|---|---|---|---|---|---|---|---|---|
| | | | | | Photo-redox reaction | ΔE | (Peeling test) | Mass change | | Mass ratio | |
| | | | | | | | | after 1hr | after 24hrs | after 1hr | after 24hrs |
| Example 1 | a | A | Apatite-coated $TiO_2$ | 90/10 | ○ | 2.3 | ○ | 1mg | 2mg | 0% | +4% |
| Example 2 | b | B | Apatite-coated $TiO_2$ | 80/20 | ○ | 5.0 | ○ | 1mg | 3mg | 0% | 0% |
| Example 3 | c | C | Apatite-coated $TiO_2$ | 60/40 | ○ | 6.1 | ○ | 2mg | 2mg | +4% | +4% |
| Example 4 | d | D | Apatite-coated $TiO_2$ | 40/60 | ○ | 13.5 | △ | 1mg | 2mg | 0% | +4% |
| Example 5 | e | E | Apatite-coated $TiO_2$ | 30/70 | ○ | 16.2 | × | 1mg | 2mg | 0% | +4% |
| Comparative Example 1 | f | — | None | 100/0 | × | — | ○ | 1mg | 3mg | −4% | −12% |
| Comparative Example 2 | g | G | $TiO_2$ | 90/10 | ○ | 3.6 | ○ | 1mg | 3mg | 0% | 0% |
| Comparative Example 3 | h | H | $TiO_2$ | 80/20 | ○ | 7.2 | ○ | 1mg | 5mg | 0% | −8% |
| Comparative Example 4 | i | I | $TiO_2$ | 60/40 | ○ | 14.9 | ○ | 0mg | 6mg | 0% | −12% |
| Comparative Example 5 | j | J | $TiO_2$ | 40/60 | ○ | 17.2 | × | 2mg | 8mg | −4% | −20% |
| Comparative Example 6 | k | K | $TiO_2$ | 30/70 | ○ | 24.4 | × | 0mg | 8mg | 0% | −20% |

FIG. 7

| | Sample | Solution | Species of photocatalyst | EFP /photocatalyst | Evaluation 1 (Silver Nitrate) | | Evaluation 2 | Evaluation 3 | | | |
|---|---|---|---|---|---|---|---|---|---|---|---|
| | | | | | Photo-redox reaction | ΔE | (Peeling test) | Mass change | | Mass ratio | |
| | | | | | | | | after 1hr | after 24 hrs | after 1hr | after 24 hrs |
| Example 6 | m | M | Apatite-coated TiO$_2$ | 90/10 | ○ | 5.6 | ○ | 0mg | 0mg | 0% | 0% |
| Example 7 | n | N | Apatite-coated TiO$_2$ | 80/20 | ○ | 6.6 | ○ | 0mg | 0mg | 0% | 0% |
| Example 8 | p | P | Apatite-coated TiO$_2$ | 60/40 | ○ | 14.0 | ○ | 0mg | 0mg | 0% | 0% |
| Example 9 | q | Q | Apatite-coated TiO$_2$ | 40/60 | ○ | 21.4 | △ | 0mg | 0mg | 0% | 0% |
| Example 10 | r | R | Apatite-coated TiO$_2$ | 30/70 | ○ | 22.2 | × | 0mg | 0mg | 0% | 0% |
| Comarative Example 7 | s | — | None | 100/0 | × | — | ○ | 0mg | 0mg | 0% | 0% |

FIG. 10
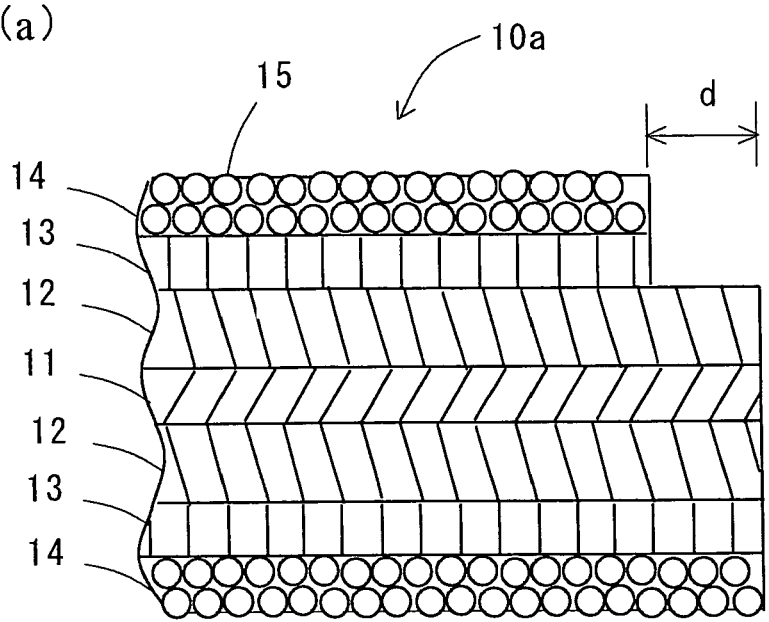
(a)
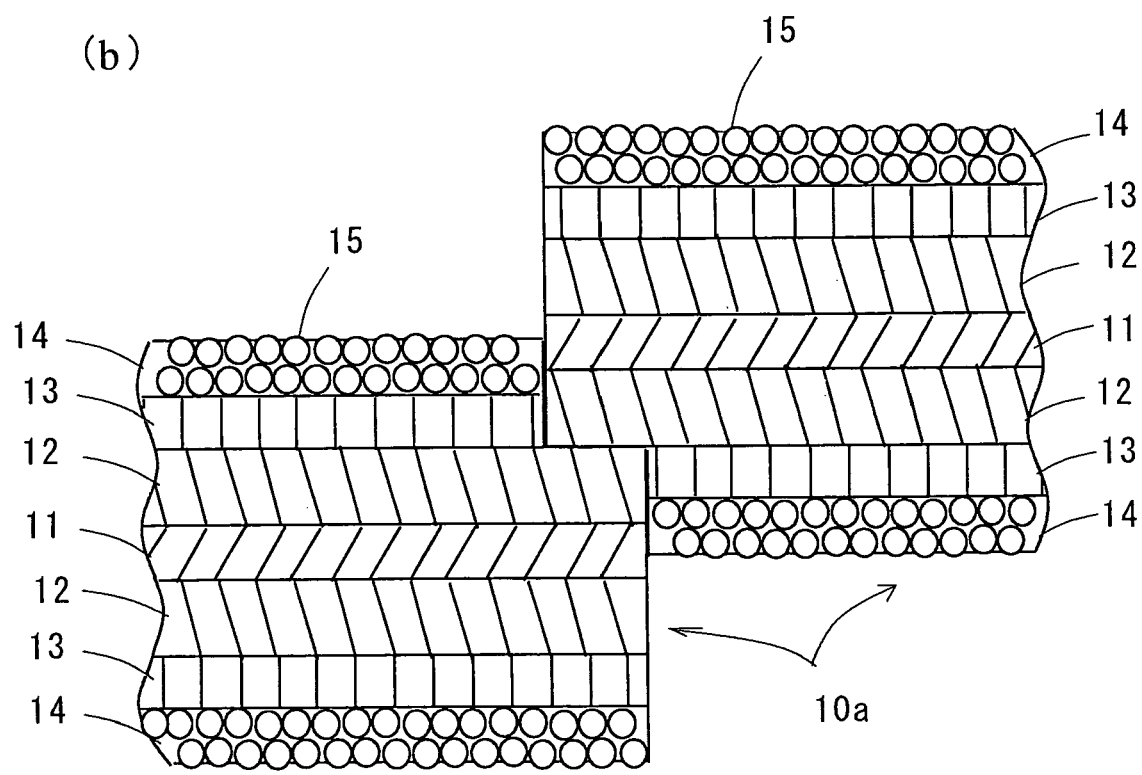
(b)

US 7,910,513 B2

PHOTOCATALYST SHEET AND METHODS OF WELDING AND MANUFACTURING THE SAME

TECHNICAL FIELD

The present invention relates to a photocatalyst sheet, methods of welding and manufacturing the same, in which the resins and rubbers as substrates or photocatalyst-containing layers are not decomposed by photocatalyst particles, and particularly relates to a photocatalyst sheet in which mutual welding of these is easy, and the effect of photo-redox reaction of photocatalysts can be readily obtained.

BACKGROUND ART

Photocatalysts are utilized in recent years widely in various fields as they have deodorant, antiseptic, and antifouling functions. For example, when the ultraviolet light included in the sunbeam and others is irradiated on to the sheets containing photocatalyst particles, photo-redox reaction occurs so that the organic fouling or others attached on the surface of the sheet is decomposed. On the other hand, photocatalysts act not only on to fouling substances and others, but also decompose fibers and plastics themselves, so that it is considered to coat porous calcium phosphate which is inactive as a photocatalyst on the surface of titanium oxide as a photocatalyst. These were disclosed in Japanese Patent, JP 3275032 ([0006], [0009], reference 1), Japanese Patent Applications, JP 11-267519A ([0004], [0009], reference 2), JP 2000-1631A (Front page, reference 3) and JP 2000-119957A ([0009], reference 5) and PCT Application, WO01/017680 (Front page, reference 4).

FIG. 8 is a cross-sectional structural view of the conventional sheet containing photocatalysts. The conventional sheet 10 has a four layer structure as shown below. That is, the second layer 12 consisting of synthetic resins or rubbers is coated on the first layer 11 consisting of such fibers as synthetic fibers and inorganic fiber fabrics and others as a base. A middle layer 13 is coated on said second layer 12, and further a photocatalyst layer 14 having photocatalyst particles 15 such as titanium oxide or others on the middle layer 13 (for example, Japanese Patent Application, JP 10-237769 A ([0004], [0005], reference 6).

The middle layer 13 is located between the second layer 12 and the photocatalyst layer 14 so as not to deteriorate the resins and fibers composing the second layer 12 or the first layer 11 as the base, when the photocatalyst particles 15 contained in the photocatalyst layer 14 are photo-irradiated, and photo-redox reaction occurs. That is, the middle layer 13 functions as a sort of protective adhesive layer. Also, for fixing photocatalyst particles, such hardly decomposing materials as fluorocarbon resins and others are used.

FIG. 9 is a cross-sectional structural view of a sheet containing the photocatalysts different from those of FIG. 8. Although, in FIG. 8, a sheet 10 is coated in turn, on the surface of one side of the first layer 11, with the second layer 12, the middle layer 13, and the photocatalyst layer 14, there may also be a sheet 10a, as in FIG. 9, in which the second layer 12, the middle layer 13, and the photocatalyst layer 14 are coated symmetrically on both sides of the first layer 11.

As the method to weld the conventional sheets 10 and 10a, there may be method as shown below.

FIG. 10(a) is a cross-sectional view of the pre-step before welding the conventional sheet 10a, and (b) is a cross-sectional view of the welding step. In the pre-step shown in FIG. 10(a), a photocatalyst layer 14 and the middle layer 13 are removed by polishing or the like from all of the sheets 10a to be welded for the breadth d for mutually welding sheets 10a, thereby the adhesive resin layer as the second layer 12 is exposed on a surface on one side.

Next, at the welding step as shown in FIG. 10(b), the welding surfaces of breadth d are held together and thermally adhered. That is, the resins comprising the second layer 12 are molten and solidified together. As the methods of thermal adhesion, there may be hot blowing welding, hot plate welding, radio frequency welding, supersonic welding, and hot flatiron welding and others. Also, it may be possible to weld by using adhesives or double-stick tapes. Similarly for the sheet 10 the one side of which is coated with a photocatalyst layer 14, it is necessary for the photocatalyst layer 14 and the middle layer 13 of welding breadth d to be removed as the pre-step.

Thus, in case to weld sheets 10 and 10a for which photo-redox reaction by photocatalyst particles 15 has no bad influence on the second layer 12 and the first layer 11 due to the middle layer 13 located between the second layer 12 and the photocatalyst layer 14, it is necessary to remove the photocatalyst layer 14 and the middle layer 13 by welding breadth d (for example, Japanese Patent, JP 2889224 ([0007], reference 7)).

[Patent Reference 1] JP 3275032 ([0006], [0009]
[Patent Reference 2] JP 11-267519A ([0004], [0009])
[Patent Reference 3] JP 2000-1631A (Front page)
[Patent Reference 4] WO01/017680 (Front page)
[Patent Reference 5] JP 2000-119957A ([0009])
[Patent Reference 6] JP 10-237769 A ([0004], [0005])
[Patent Reference 7] JP 2889224 ([0007])

However, there may be such a problem that, if the middle layer 13 is located between the second layer 12 and the photocatalyst layer 14, process steps are increased for the manufacture of sheets 10 and 10a, thereby it causes low manufacturing efficiency and high cost.

There may also be a problem that, in case of mutually welding the conventional sheets 10 and 10a, a complicated process at the welding step is required in which the photocatalyst layer of welding breadth must be removed. There may also be a problem that, in case of fixing photocatalyst particles, such hardly decomposing materials as fluorocarbon and others are necessary to be used, thereby processing is difficult and cost is high.

DISCLOSURE OF THE INVENTION

The purpose of the present invention is, considering the problems mentioned above, to offer a photocatalyst sheet and the methods of welding and manufacturing the same, in which the resins and rubbers as substrates or photocatalyst-containing layers are not decomposed by photocatalyst particles, mutual welding of sheets is easy, and the effect of photo-redox reaction of photocatalysts can be readily obtained.

In order to achieve the above-mentioned purpose, a first aspect of a photocatalyst sheet of the present invention is characterized in that it is the photocatalyst sheet comprising a substrate made of synthetic fiber, a coated layer made of a resin or a rubber coated on both sides of said substrate, and a photocatalyst-containing layer coated on at least one side of said coated layer, said photocatalyst-containing layer contains a resin or a rubber and apatite-coated photocatalyst particles, the ratio of said apatite-coated photocatalyst particles to said photocatalyst-containing layer is 10-40 weight %, and the peeling rate of said welded part from said substrate is 50 mm/min when said photocatalyst sheets are mutually thermally welded.

The invention as set forth in claim 2 is characterized in that it is the photocatalyst sheet comprising a substrate made of polyester fiber, a coated layer made of vinyl chloride resin coated on both sides of said substrate, and a photocatalyst-containing layer coated on at least one side of said coated layer, said photocatalyst-containing layer contains vinyl chloride and acrylic resins and apatite-coated photocatalyst particles, the ratio of said apatite-coated photocatalyst particles to the photocatalyst-containing layer is 10-40 weight %, and the peeling rate of said welded part from said substrate is 50 mm/min when said photocatalyst sheets are mutually thermally welded.

A second aspect of a photocatalyst sheet of the present invention is characterized in that it comprises a substrate made of inorganic fiber, coated layers made of a fluorocarbon resin coated on both sides of said substrate, and a photocatalyst-containing layers coated on at least one side of said coated layer, said photocatalyst-containing layers contain a fluorocarbon resin and apatite-coated photocatalyst particles, the ratio of said apatite-coated photocatalyst particles to said photocatalyst-containing layer is 10-40 weight %, and the peeling rate of said welded part from said substrate is 50 mm/min when said photocatalyst sheets are mutually thermally welded.

A third aspect of a photocatalyst sheet of the present invention is characterized in that it comprises: a substrate made of glass fiber, a coated layer made of PTFE coated on both sides of said substrate, and a photocatalyst-containing layer coated on at least one side of said coated layer, said photocatalyst-containing layer contains a fluorocarbon resin being either one of PTFE, FEP, or PFA and apatite-coated photocatalyst particles, the ratio of the apatite-coated photocatalyst particles to said photocatalyst-containing layer is 10-40 weight %, and the peeling rate of said welded part from said substrate is 50 mm/min when said photocatalyst sheets are mutually thermally welded.

Said apatite-coated photocatalyst particles fixed in said photocatalyst containing layer preferably have parts exposed from the surface of said photocatalyst containing layer. Said apatite-coated photocatalyst particles are preferably the photocatalyst particles either a part of the surface of which is coated with apatite, or a whole surface of which is coated with porous apatite. Especially, the quantity of coating of apatite to be coated on said photocatalyst particles is preferably such that the weight loss ratio of whole of said photocatalyst sheet is 10% or less in case that the ultraviolet light of intensity 18 mW/cm$^2$ is irradiated for one hour on the surface of said photocatalyst sheet. The photocatalyst particle is preferably either or both of an ultraviolet light responsive type and a visible light responsive type.

Said photocatalyst particle preferably contains titanium oxide, and said apatite is preferably either one of apatite hydroxide, apatite carbonate, apatite fluoride, or apatite chloride, or mixture thereof. Said substrate is preferably made of such synthetic fiber as polyamide fiber, polyaramide fiber, polyester fiber, polyvinyl chloride fiber, polyvinylidene chloride fiber, acrylic fiber, polyvinyl alcohol fiber, polypropylene fiber, polyethylene fibers or others. Said substrate may also be such inorganic fiber as glass fiber, silica fiber, or basalt fiber or others.

Said apatite-coated photocatalyst particles are preferably fixed with the resin or rubber constituting said photocatalyst-containing layer. Also, said resin is preferably either of polyvinyl chloride, polyethylene, polypropylene, ethylene-vinyl acetate copolymer, polyurethane, fluorocarbon resin, polystyrene, acrylonitrile-butadiene-styrene copolymer, polyamide, acrylic, polycarbonate, methylpentene resins, or the mixture thereof, and said rubber is preferably either of chloroprene, chlorosulfonated polyethylene, natural, butadiene, styrene, butyl, nitrile, acrylic, urethane, silicone, fluorocarbon, and ethylene-propylene rubbers. Especially, said fluorocarbon resin is preferably either of polytetrafluoro-ethylene (PTFE), tetrafluoroethylene-hexafluoropropylene copolymer (FEP), tetrafluoroethylene-perfluoro-alkylvinylether copolymer (PFA), polyvinyl fluoride (PVF) or polyvinylidene fluoride (PVDF).

With a photocatalyst sheet of the present invention, since resin or rubber is exposed on the surface of a photocatalyst-containing layer as the surface of a photocatalyst sheet, either direct thermal adhesion or welding with adhesive or double-stick tape is possible, and no particular process is required for mutual welding of photocatalyst sheets, thereby welding is quite easy. Also, since apatite-coated photocatalyst particles are dispersed and fixed on said photocatalyst-containing layer, the photocatalytic function can be attained. Further, since photocatalyst particles are coated with apatite, the photocatalytic function is not extended to the materials other than the photocatalyst of a photocatalyst-containing layer, the first coated layer of the third aspect, and the substrate. That is, the substrate is hardly decomposed by photo-redox reaction. Especially in the third aspect, by locating the first coated layer made of the same material that in the photocatalyst-containing layer but the photocatalyst removed therefrom between the substrate and the second coated layer as the photocatalyst-containing layer, the photocatalyst-containing layer can be made thin, thereby the amount of apatite-coated photocatalyst particles fixed in the photocatalyst-containing layer can be much reduced. Also, since apatite-coated photocatalyst particles are used as photocatalyst particles, it is not necessary to use such hardly decomposing material as fluorocarbon resin and others. Here, however, apatite-coated photocatalyst particles may be fixed with fluorocarbon resin.

On the other hand, a method of welding the photocatalyst sheets of the present invention is characterized in that said photocatalyst sheet comprises a substrate made of polyester fiber, coated layers made of polyvinyl chloride coated on both sides of said substrate, and photocatalyst-containing layers coated on at least one side of said coated layer, said photocatalyst-containing layers contain polyvinyl chloride and acrylic resins, and apatite-coated photocatalyst particles, the ratio of said apatite-coated photocatalyst particles to said photocatalyst-containing layer is 10-40 weight %, and the peeling rate of said welded part from said substrate is 50 mm/min when the welding surfaces are held together and mutually welded without removing photocatalyst-containing layers of said photocatalyst sheets, thereby said photocatalyst sheets are mutually thermally welded.

A second method of welding the photocatalyst sheets of the present invention is characterized in that the photocatalyst sheet comprises a substrate made of glass fiber, first coated layers made of PTFE coated on both sides of said substrate, and photocatalyst-containing layers coated on at least one side of said first coated layer, said photocatalyst-containing layers contain fluorocarbon resin being either one of PTFE, FEP, or PFA, and apatite-coated photocatalyst particles, the ratio of said apatite-coated photocatalyst particles to said photocatalyst-containing layer is 10-40 weight %, and the peeling rate of said welded part from said substrate is 50 mm/min when the welding surfaces are held together and mutually welded without removing photocatalyst-containing layers of said photocatalyst sheets, thereby said photocatalyst sheets are mutually thermally welded. It is particularly preferable to thermally weld the resins present on said welding surfaces.

According to the method of welding the photocatalyst sheets of the present invention, the pre-step treatment as in prior arts to remove the photocatalyst layer of welding breadth, and to expose the resin layer on the surface is no longer necessary, thereby welding is quite easy. Especially in case of thermal adhesion, welding with sufficient welding strength is possible by making the ratio of apatite-coated photocatalyst particles to resin 10-40 weight %.

The method of manufacturing photocatalyst sheets of the present invention is the method of manufacturing photocatalyst sheets comprising a substrate made of polyester fiber and a coated layer made of polyvinyl chloride coated on both sides of said substrate, and at least one side of the outermost layers of said coated layer is made the photocatalyst-containing layer by fixing apatite-coated photocatalyst particles, characterized in that said photocatalyst-containing layer is made of polyvinyl chloride and acrylic resins, said photocatalyst-containing layer is formed by coating the dispersion containing said apatite-coated photocatalyst particles, said apatite-coated photocatalyst fine particles are fixed with the polyvinyl chloride and acrylic resin constituting said photocatalyst-containing layer, the ratio of said apatite-coated photocatalyst particles to said photocatalyst-containing layer is 10-40 weight %, and the peeling rate of said welded part from said substrate is 50 mm/min when said photocatalyst sheets are mutually thermally welded.

The method of manufacturing photocatalyst sheets of the present invention is also the method of manufacturing photocatalyst sheets comprising a substrate made of glass fiber and a coated layer made of PTFE on both sides of said substrate, and at least one side of the outermost layers of said coated layer is made the photocatalyst-containing layer by fixing apatite-coated photocatalyst particles, characterized in that said photocatalyst-containing layer is made of a fluorocarbon resin being either one of PTFE, FEP, or PFA, said photocatalyst-containing layer is formed by coating the dispersion containing the apatite-coated photocatalyst particles, said apatite-coated photocatalyst particles is fixed with said fluorocarbon resin constituting said photocatalyst-containing layer, the ratio of said apatite-coated photocatalyst particles to said photocatalyst-containing layer is 10-40 weight %, and the peeling rate of said welded part from said substrate is 50 mm/min when said photocatalyst sheets are mutually thermally welded.

In the above-mentioned method of manufacturing, the dispersion preferably comprises polyvinyl chloride and acrylic resins, the apatite-coated photocatalyst particles, and organic solvent. Also preferably the dispersion comprises said fluorocarbon resin being either one of PTFE, FEP, or PFA, apatite-coated photocatalyst particles, and water.

According to the method of manufacturing photocatalyst sheets of the present invention, the photocatalyst-containing layer that contains apatite-coated photocatalysts on the outermost layer of the substrate can be easily formed by dispersion coating and other methods.

With photocatalyst sheets and method of manufacturing the same of the present invention, photocatalyst sheets can be easily obtained and welded mutually. Also, since apatite-coated photocatalyst particles are dispersed and fixed on said photocatalyst-containing layer, a substrate is hardly decomposed by photo-redox reaction caused by the photocatalytic function. Also, since a material capable of mutually welding by melt and solidifying exists on the surface of a photocatalyst-containing layer, pre-step treatment is not required unlike conventional welding process. Especially like the third aspect of the photocatalyst sheets of the present invention, by locating the first coated layer made of the same material that in the photocatalyst-containing layer but the photocatalyst removed therefrom between the substrate and the second coated layer as the photocatalyst-containing layer, the photocatalyst-containing layer can be made thin, thereby the amount of apatite-coated photocatalyst particles fixed in the photocatalyst-containing layer can be much reduced. Also, since apatite-coated photocatalyst particles are used as photocatalyst particles, it is not necessary to use such hardly decomposing material as fluorocarbon resin and others, thereby cost is not raised and process is not difficult. Here also, it is applicable to the case of fixing apatite-coated photocatalyst particles with fluorocarbon resin. Especially, by adopting not only the ultraviolet light responsive type but also the visible light responsive type as photocatalyst particles, the photocatalytic function can be attained by indoor illumination and the like. Also, by making the ratio of apatite-coated photocatalyst particles to resin or rubber 10-90 weight %, the photocatalytic function can be fully attained without deterioration of resin, rubber, or substrates.

Further, according to the method of welding of photocatalyst sheets of the present invention, in the photocatalyst-containing layer, and also on its surface, apatite-coated photocatalyst particles are preferably dispersed and fixed. Therefore, the resin as its fixer exists on the surface, and photocatalyst-containing layers of photocatalyst sheets are mutually molten and solidified by welding said photocatalyst sheets together with adhesive or double-stick tape, or by thermal treating, and said photocatalyst sheets can thus be welded. Thus, the pre-step of treatment to partially remove the middle layer or the photocatalyst layer upon welding is not necessary unlike prior arts, thereby the welding procedure is largely shortened. Further, in case of thermal adhesion, sufficient welding strength can be attained upon welding of photocatalyst sheets by making the ratio of apatite-coated photocatalyst particles to resin or rubber 10-60 weight %.

BRIEF DESCRIPTION OF THE DRAWINGS

FIG. 6 is the table showing the evaluation results of the PVC sheet of apatite-coated titanium oxide photocatalyst of Examples 1-5 and the outermost layer of Comparative Examples 1-6 for photocatalytic activity, thermal adhesibility, and the mass change ratio by photoxidative decomposition.

FIG. 7 is a table showing the results of evaluation of photocatalytic activity, thermal adhesibility, and the mass change ratio by photoxidative decomposition of the PTFE sheet with the FEP layer containing the apatite-coated titanium oxide photocatalyst as the outermost layer of Examples 6-10 and of the outermost layer of Comparative Example 7.

FIG. 10 is a cross-sectional view illustrating the conventional method of welding of a photocatalyst sheet, in which (a) is the cross-sectional view at a pre-step, and (b) is the cross-sectional view at a welding step.

BEST MODES FOR CARRYING OUT THE INVENTION

The embodiments of the present invention are explained in detail by the drawings attached hereto.

Figure 1:
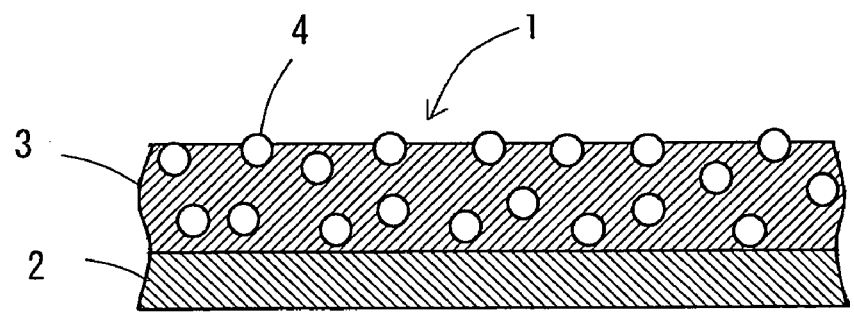
FIG. 1 is a cross-sectional view of a photocatalyst sheet of the present invention.

FIG. 1 is a cross-sectional view of a photocatalyst sheet of the present invention. The photocatalyst sheet 1 of FIG. 1 consists of a substrate 2, and a coated layer 3 on which apatite-coated photocatalyst particles 4 are dispersed and fixed. Here in the present specification including claims, the substrate 2 indicates an image of various products themselves or the materials used for said products, and is used as including the image of the state with a surface coating coated on the surface of a material, or the state before coated. As the substrate 2, for example, such as film/fabric structures for baseball stadiums, domes for events, soccer stadiums, tent storages, gymnasiums, and for commercial facilities, materials used for window roof tents, truck covers, mulching sheets, and flexible containers, water-proof cloths used for rain coats, bags, and chairs, fiber-reinforced resins used for machines such as belt conveyers, and timing belts may be mentioned. In case that the substrate 2 is a fiber, such natural fibers as kenaf, jute and others, such synthetic fibers as polyamide, polyaramide, polyester, polyvinyl chloride, polyvinylidene chloride, acrylic resin, polyvinyl alcohol, polypropylene, polyethylene fibers, and such inorganic fibers as glass fiber, silica fiber, and basalt fiber may be mentioned, and they may also be their woven textiles.

The coated layer 3 is a photocatalyst-containing layer in which apatite-coated photocatalyst particles 4 are fixed with resin or rubber. The fixer to fix apatite-coating photocatalyst particles 4 is not necessary to be such a hardly decomposing material as fluorocarbon resin, as the surface of photocatalyst particles is coated with apatite. Also, in the coated layer 3, the ratio of apatite-coated photocatalyst particles 4 to resin or rubber is preferably 10-60 weight %, in order to attain sufficient welding strength upon thermal welding of photocatalyst sheets 1 without removing a photocatalyst-containing layer.

As a resin, for example, either vinyl chloride (PVC), polyethylene (PE), polypropylene (PP), ethylene-vinyl acetate copolymer (EVA), polyurethane (PU), fluorocarbon resin, polystyrene (PS), acrylnitrile-butadiene-styrene copolymer (ABS), polyamide (PA, nylon (registered trademark)), acrylic resin (PMA), polycarbonate (PC), and methylpentene (TPX) resins, or the mixture of these thereof may be mentioned. Here, as a fluorocarbon resin, such polymers of fluorocarbon resin monomers as polytetrafluoroethylene (PTFE), tetrafluoroethylene-hexafluoropropylene copolymer (FEP), tetrafluoroethylene-perfluoroalkylvinylether copolymer (PFA), polyvinyl fluoride (PVF), and polyvinylidene fluoride (PVDF) may be mentioned. Also as a rubber, chloroprene (CR), chlorosufonated polyethylene (CSM) rubbers, natural rubber (NR), butadiene (BR), styrene (SBR), butyl (IIR), nitrile (NBR), acrylic (ACM), urethane (U), silicone (Si), fluorocarbon (FPM), and ethylene-propylene (EPDM) rubbers may be mentioned.

Apatite-coated photocatalyst particles 4 fixed on the coated layer 3 are particles coated with apatite inactive as the photocatalyst over the surface of photocatalyst particles either partly as island-like or all over. The quantity of apatite coating on photocatalyst particle is to such extent that the substrate or the resin or others are not decomposed by a photocatalyst. For example, in case that the ultraviolet light of the intensity 18 mW/cm$^2$ is irradiated on the surface of a photocatalyst sheet for one hour, the weight decrease ratio of whole photocatalyst sheet 1 by photocatalytic action is preferably 10% or less. Here, the ultraviolet light is irradiated by lamp designed mainly around 360 nm generation such as a high pressure mercury lamp, a fluorescent lamp, a xenon lamp, a black light and others.

In case that apatite-coated photocatalyst particles 4 are that the whole surface of which is coated with apatite, the apatite needs to be porous, and the active photocatalyst is exposed at the bottom of micropores on the apatite surface.

Here, the photocatalyst is a material also called a photo-semiconductor, and is, for example, a photocatlyst fine particle of anatase-type $TiO_2$ (titanium dioxide, forbidden band gap Eg 3.2 eV, wavelength 388 nm) of 1-100 nm. As a titanium oxide (oxidized titanium), such as rutile-type $TiO_2$ (Eg 3.0 eV, wavelength 414 nm) and titanium trioxide ($TiO_3$) may be mentioned in addition to anatase-type $TiO_2$, and may be either one of them. Further as a photocatalyst, zinc oxide (ZnO, Eg 3.2 eV, wavelength 388 nm), strontium titanate ($SrTiO_2$, Eg 3.2 eV, wavelength 388 nm), and tungsten trioxide ($WO_3$, Eg 3.2 eV, wavelength 388 nm) may be used.

Also, the photocatalyst may be of the visible light responsive type that initiates photo-redox reaction by visible light included in the interior illumination, as well as the ultraviolet light responsive type that initiates the photo-redox reaction by ultraviolet light, or of the mixture thereof.

Apatite contains calcium phosphate as a major component, and may be apatite hydroxide (hydroxyapatite), apatite carbonate, apatite fluoride, or apatite chloride, or the mixture thereof.

That is, apatite may practically consist of apatite hydroxide ($Ca_{10}(PO_4)_6(OH)_2$), and may be allowable to contain a small amount of other components. Said apatite hydroxide may be such apatite as to have various chemical structures in which Ca site, $PO_4$ site, and OH site are substituted with other elements or molecules, or a part solid solution.

Here, Ca of Ca site may be substituted with Sr, Ba, Pb, Cd, Ra, or others. Or such elements as Nd, Y, La, Mn, Fe, Zn, Tl, Rh, H, or others may be partly solid-dissolved. $PbO_4$ of Pb site may be substituted with $VO_4$, $AsO_4$, $CrO_4$, or others. Or such as $CO_3$, $HPO_4$, $BO_3$, or others may be partly solid-dissolved. OH of OH site may be substituted with F, Cl, Br, O, $CO_3$, $BO_2$, or others.

Apatite is also preferably difficultly water-soluble so as not to precipitate easily. It is also preferably coated with porous apatite. Owing to porosity, the exposed part with the uncoated photocatalyst surface exists in pores, and the photo-redox reaction is initiated by irradiating this part. That is, under the irradiation of light, especially ultraviolet or visible light, the organic substances and organic compounds, harmful or else, adsorbed on apatite such as calcium phosphate are easily decomposed and removed by the photo-redox reaction of electrons and positive holes generated by a photocatalyst, thereby such photocatalytic functions as antifouling, antiseptic, and deodorant are attained. In case that a visible light responsive type photocatalyst is used, and the photocatalyst sheet is used indoors, then photocatalytic reaction is caused by illumination or others, and environment-contaminating substances are also decomposed. Also, since the water contact angle of the photocatalyst sheet surface is made 130 degrees or less by photocatalytic reaction, and hence the sheet surface is wetted, water dew dropping from condensation can be presented in case of photocatalyst sheets are used as film/fabric structures or tents.

Because apatite coats a photocatalyst, it does not practically occur that the resin or rubber to fix apatite-coated photocatalyst particles 4 directly contact the photocatalyst surface. Also, since said apatite is inactive as a photocatalyst, even if it is used by adding and mixing to the medium of resin or rubber comprising the coating layer 3 that fixes the apatite-coated photocatalyst particles 4, said resin or rubber is protected with apatite, and the decomposition of the medium of resin or rubber itself hardly occurs. Therefore, the photo-redox reaction by the photocatalyst does not influence badly on the substrate 2 underneath, and the stability of the photocatalyst sheet 1 can be enhanced.

Also, since apatite has such properties as to adsorb miscellaneous microbes, bacterias in the air, viruses, the organics and nitrogen oxides (NOx) as the source of filthy odor, and harmful substances such as volatile organic compounds (VOC), especially the apatite-coated photocatalyst particles 4 fixed on the surface of the photocatalyst-containing layer adsorb said harmful substances, as well as destroy or decompose said adsorbed harmful substances surely and efficiently by the powerful oxidizability of a photocatalyst.

It may be not only said apatite-coated photocatalyst particles 4 which are coated only with apatite, but also those which have higher rate of oxidative decomposition by photo-catalytic function by mixing such metals as Pt, Rh, Ru, Pd, Ag, Cu, and Zn to the surface part of photocatalyst particles upon coating with apatite. Also, the apatite-coated photocatalyst particles 4 are preferably uniformly dispersed and fixed in the coated layer 3 as the photocatalyst-containing layer.

Also, as for the apatite-coated photocatalyst particles 4 on the surface of the photocatalyst-containing layer, they may rather be exposed from the surface of the coated layer 3, that is, the photocatalyst-containing layer, thereby photo-redox reaction easily occurs by the irradiation of the ultraviolet light included in the sun beam and others, and photocatalytic function can be more easily attained. In order to enhance the photocatalytic function, the area of the apatite-coated photocatalyst particles 4 exposed on the surface of the photocatalyst-containing layer is made large. Therefore, the diameter of apatite-coated photocatalyst particles 4 is desirably appropriately small.

Figure 8:
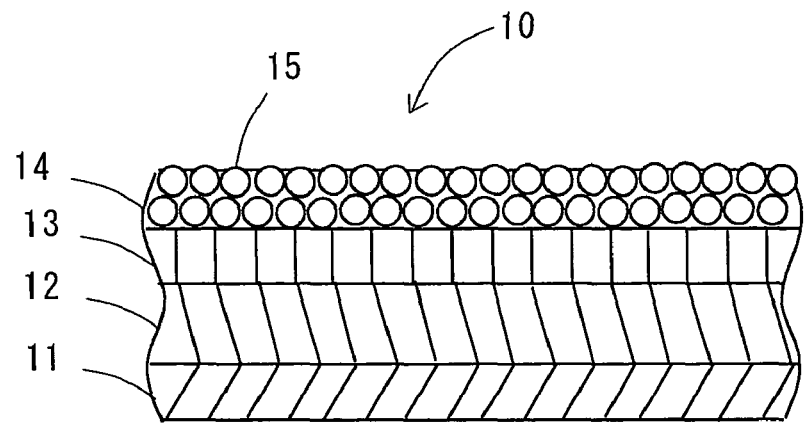
FIG. 8 is a cross-sectional view of the conventional photocatalyst sheet.
Figure 9:
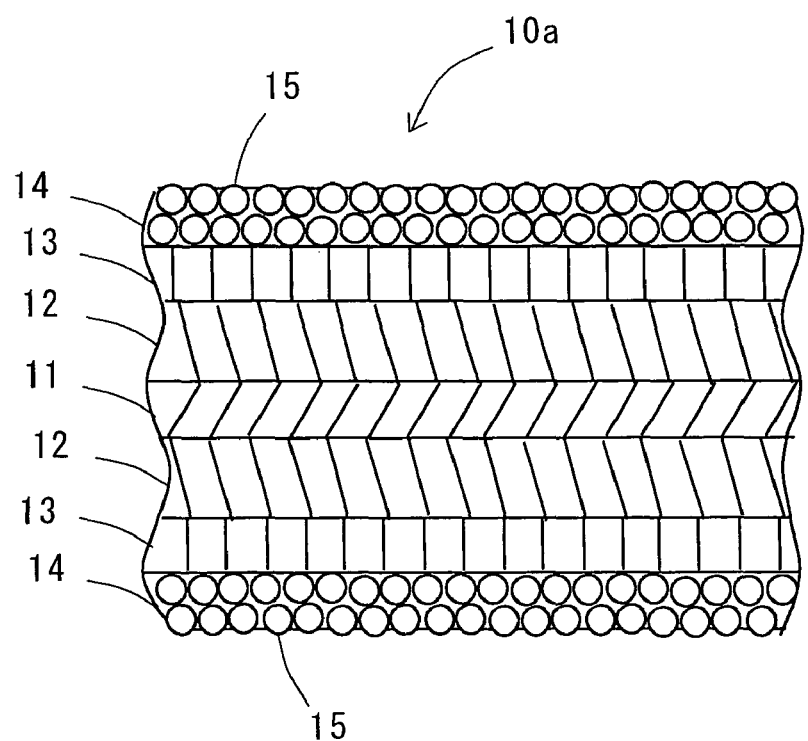
FIG. 9 is a cross-sectional view of the conventional photocatalyst sheet, different from FIG. 8.

Also, different from the conventional sheet 10 (FIG. 8) in which photocatalyst particles 15 are packed into the photocatalyst layer 14, they are dispersed and fixed in the photocatalyst-containing layer as the coated layer 3 according to the present invention. Thereby, more than required apatite-coated photocatalyst particles 4 are not needed to be prepared. Also, in order to give electric conductivity to a photocatalyst sheet 1, and to enhance the photocatalytic effect, metallic materials, photocatalytic function-aiding substances, and others may be added to the coated layer 3. As the metallic materials, Ag, Al, Au, Cu, Fe, In, Ir, Ni, Os, Pd, Pt, Rh, Ru, Sb, Sn, Zn, Zr, and others may be mentioned. Here also in the coated layer 3, such adsorbents as active carbon and zeolite to absorb bad odor substances and harmful substances may be added depending on the purpose of use of the photocatalyst sheet 1.

Figure 2:
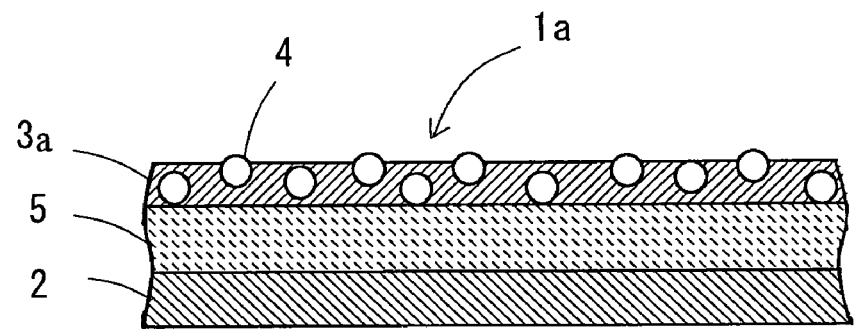
FIG. 2 is a cross-sectional view of a photocatalyst sheet of the present invention, different from FIG. 1

FIG. 2 is a cross-sectional view of a photocatalyst sheet of the present invention different from FIG. 1. The photocatalyst sheet 1a of FIG. 2 is a triple layer structure composed with a substrate 2, a first coated layer 5 coated on one side of the substrate 2, and a second coated layer 3a coated on the first coated layer 5. The second coated layer 3a is a photocatalyst-containing layer in which apatite-coated photocatalyst particles 4 are dispersed and fixed. Here, the substrate 2 is same as that of FIG. 1, and the second coated layer 3a is same as the coated layer 3 of FIG. 1, but the second coated layer 3a of the photocatalyst sheet 1a is thinner than the photocatalyst sheet 1 (FIG. 1) in comparison.

Here, the first coated layer 5 is made of the resin or rubber that fixes the apatite-coated photocatalyst particles 4 in the second coated layer 3a. For all other aspects, it is same as the photocatalyst sheet of FIG. 1. By this makeup, the quantity of the apatite-coated photocatalyst particles 4 dispersed and fixed in the photocatalyst-containing layer as the second coated layer 3a can be reduced, and thereby the cost can be lowered, as well as the strength of the photocatalyst sheet 1a is comparable with the photocatalyst sheet 1 of FIG. 1, and mutual welding of the photocatalyst sheets can be conducted as in the case of FIG. 1.

Figure 3:
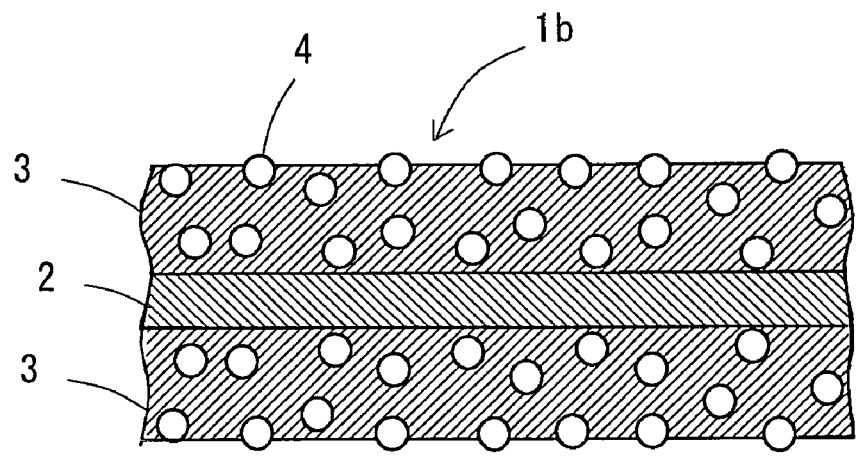
FIG. 3 is a cross-sectional view of a photocatalyst sheet of the present invention, different from FIGS. 1 and 2.

FIG. 3 is a cross-sectional view of a photocatalyst sheet of the present invention different from FIGS. 1 and 2. The photocatalyst sheet 1b of FIG. 3 is a sheet coated with the coated layer 3 on both sides of the substrate 2, different from the photocatalyst sheet 1 of FIG. 1 in which the coated layer 3 coated on one side of the substrate. Here, the substrate 2 and each layer of the coated layer 3 are same as those of FIG. 1. As shown in FIG. 3, in case of the coated layer 3 as the photocatalyst-containing layers on both sides of the photocatalyst sheet 1b, apatite-coated photocatalyst particles 4 coated with apatite on the ultraviolet responsive type photocatalyst particles may be used for the coated layer 3 on one side of the photocatalyst sheet 1b, whereas apatite-coated photocatalyst particles 4 coated with apatite on the visible light responsive type photocatalyst particles may be used for the coated layer 3 on the other side of the photocatalyst sheet 1b. Here, though a figure is omitted, similarly with the case of the photocatalyst sheet 1a of FIG. 2, the first coated layer 5 may be coated on both sides of the substrate 2, and further the second coated layer 3a may be coated on the first coated layer 5.

Figure 4:
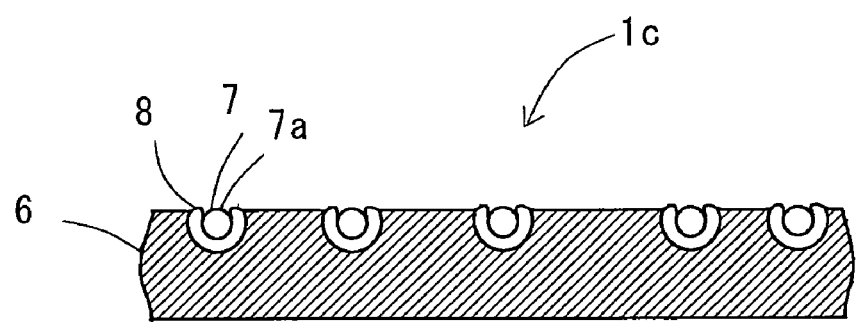
FIG. 4 is a cross-sectional view of a photocatalyst sheet of the present invention, different from FIGS. 1 through 3.

FIG. 4 is a cross-sectional view of a photocatalyst sheet of the present invention different from FIGS. 1 through 3. The photocatalyst sheet 1c of FIG. 4 is a sheet in which photocatalyst particles 7 are fixed on the surface of the substrate 6. Here, the substrate 6 is made of the material the surface of which as the mutual welding surfaces of the photocatalyst sheets 1c can be thermally adhered. For example, as the material for the substrate 6, the various resins and rubbers mentioned above may be used. Also on the surface of the substrate 6, the photocatalyst particles 7 coated with apatite 8 are fixed. A part of the fixed photocatalyst particles 7 may be coated with apatite 8, and the surface of photocatalyst particles 7, that is, the surface 7a not coated with apatite 8 may be preferably exposed to the atmospheric side. Thereby, the photocatalyst particles 7 are more easily irradiated with light, and the photocatalytic function is efficiently attained. Here, though photocatalyst particles 7 are fixed on the surface of one side of the substrate 6 in FIG. 4, fixing photocatalyst particles 7 on both sides of the substrate 6 may make welding work easier, for each confirming step of the surface to be welded upon welding is not necessary.

Next, as for the method of welding photocatalyst sheets 1, 1a, and 1b of the present invention, the method of mutual welding of photocatalyst sheets 1b of FIG. 3 is explained as an example.

Figure 5:
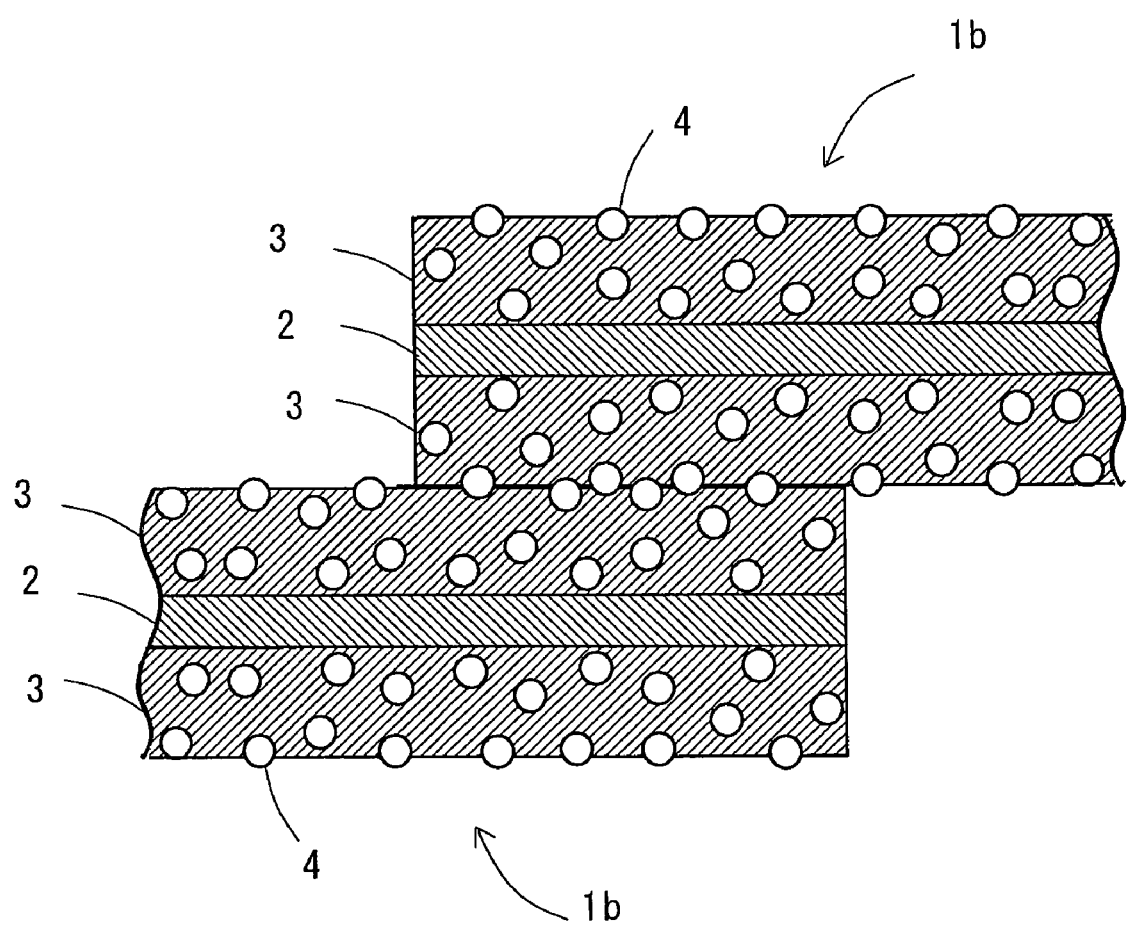
FIG. 5 is a cross-sectional view illustrating the method of welding of a photocatalyst sheet of the present invention.

FIG. 5 is a cross-sectional step of mutual welding of photocatalyst sheets as shown in FIG. 3. The both sides of the photocatalyst sheet 1b are the coated layers 3, and said coated layer 3 is the photocatalyst-containing layer in which apatite-coated photocatalyst particles 4 are dispersed and fixed. In the photocatalyst-containing layer, apatite-coated photocatalyst particles 4 are not packed, but dispersed, and on its surface and in its inside, the resin to fix the apatite-coated photocatalyst particles 4 exists.

Thereby at the step of mutual welding of photocatalyst sheets 1b, by holding the surfaces to be welded of photocatalyst sheets 1b, and thermally adhering them, the resins of the photocatalyst-containing layers are readily molten and solidified, and thus photocatalyst sheets 1b can be welded. Here, as thermal adhesion, those by hot blowing, hot plate, radio frequency, supersonic, and by hot flatiron are mentioned. The method of welding described above can be similarly applied without modification to other photocatalyst sheets 1 and 1a, which were already explained, since their surfaces have a similar photocatalyst-containing layer.

As explained above, apatite-coated photocatalyst particles are used in photocatalyst sheets, and said apatite-coated photocatalyst particles are fixed with resin or rubber. Thereby, the photocatalytic function, that is, the influence of photo-redox reaction can be made not to affect on the material other than the photocatalyst in the photocatlyst-containing layer, the first coated layer in the photocatalyst sheet of FIG. 2, and on a substrate, and hence excess parts need not be removed upon welding.

Also, in order to mutually weld said photocatalyst sheets, the prior arts needed to remove the excess photocatalyst layer and the middle layer, but the present invention has no part to remove, as explained above, and since the surfaces to be welded of the photocatalyst sheets may be held together and thermally adhered, the production cost can be reduced, and no waste matter is produced because there can be no part to remove, whereas the prior arts produced waste from the removing process.

Next, the method of manufacturing the photocatalyst sheet of the present invention is explained.

The photocatalyst sheet of the present invention can be manufactured by coating after uniformly dispersing the synthetic resin dispersion containing the apatite-coated photocatalyst on the sheet coated with vinyl chloride resin (hereinafter to be called PVC sheet) or the sheet coated with PTFE (hereinafter to be called PTFE sheet) on both sides of polyester fiber textile or glass fiber textile, drying at certain temperature for certain time, and by spontaneous cooling.

Here, the synthetic resin dispersion containing the apatite-coated photocatalyst is the dispersion made by adding synthetic resins such as vinyl chloride and acrylic, the powder of apatite-coated photocatalyst, and such diluents as methylethylketone (MEK) and others to organic solvent such as MEK and/or toluene, and mixing and stirring. Any organic solvents and diluents may be used so far as synthetic resins are soluble in it, and are not limited to the compounds mentioned above. The diluent is added so that the viscosity of dispersion becomes 100 mPa·s or lower to improve coatability.

The powder of apatite-coated photocatalyst can be directly kneaded into synthetic resins such as vinyl chloride and acrylic resin without organic solvents, but is more preferably coated as dispersion using organic solvent, with manufacturing efficiency and easiness of mixing taken into consideration. When the synthetic resin other than fluorocarbon resin or rubber is used for dispersion, the coating amount is preferably 5-20 g/m² on the outermost surface layer, and drying temperature is preferably 70-120 degrees centigrade depending upon the kind of solvent to be used.

Also in case that fluorocarbon resin is used for dispersion, such fluorocarbon resins as PTFE, PFA, and FEP can be used in a form of enamel paint using such solvent as butyl acetate and others, as well as in a form of aqueous dispersion. Also, PVF (polyvinyl fluoride) can be dissolved in an appropriate organic solvent, such as MEK, toluene, acetone, and others though not specifically limited. The coating amount is preferably 5-30 g/m² on the outermost surface layer of fluorocarbon resin layer.

Here, the method of coating may be any of bar-coating, gravure-coating, direct gravure-coating, microgravure-coating, gravure reverse-coating, comma-coating, roll-coating, reverse roll-coating, dip-coating, kiss-coating, dye-coating, and flow-coating, which are the methods of uniform coating.

Also, the photocatalyst sheet of the present invention can be manufactured when synthetic resins other than fluorocarbon resin or rubber are used. In this case it is possible to laminate a film as a form of sheet that is made to a sheet by calendar process or others (film-making), on the outermost layer of the substrate. The resin or rubber that contains apatite-coated photocatalyst particles, and plasticizer, processing aid, weather stabilizer, anti-oxidant, and pigment, as required, is melted, kneaded, and made to a sheet (film-making). Then, photocatalyst sheet of the present invention can be formed that this sheet is laminated on the outermost layer of the substrate. As the substrate, the substrate coated with resin or rubber may be used.

Example 1

First, Examples 1-5 and Comparative examples 1-6 are explained for the photocatalyst sheet with the apatite-coated photocatalyst particles fixed on the surface of PVC sheet which is the polyester fiber textile both sides of which are coated with vinyl chloride resin.

As Example 1, an organic solvent type surface treatment reagent for vinyl chloride resin (Dainichiseika Color & Chemicals Mfg. Co., Ltd., Leatherhit LM-1249, non-volatile component 13.5 weight %) 10.0 g, the powder of apatite-coated anatase type titanium dioxide photocatalyst (Showa Denko, F1S02 (average particle diameter 90 nm, apatite coating 2%)) 0.15 g, and MEK 3.5 g as diluent were mixed and stirred to make Solution A. The ratio of vinyl chloride (PVC) and acrylic (PMA) resins to apatite-coated titanium oxide in said Solution A was 90:10.

Next, said Solution A was coated by bar coating on one side of PVC sheet that was polyester fiber textile both sides of which were coated with vinyl chloride resin. After drying this coat at ordinary temperature, it was thermally dried at 100 degrees centigrade for 2 minutes, and spontaneously cooled to prepare Sample a of Example 1.

Example 2

Similarly to Example 1 except that the powder of apatite-coated titanium dioxide photocatalyst was 0.34 g, Solution B was prepared, and Sample b of Example 2 was prepared. The ratio of vinyl chloride and acrylic resin to apatite-coated titanium dioxide in said Solution B was 80:20.

Example 3

Similarly to Example 1 except that the powder of apatite-coated titanium dioxide photocatalyst was 0.90 g, Solution C was prepared, and Sample c of Example 3 was prepared. The ratio of vinyl chloride resin and acrylic resin to apatite-coated titanium dioxide in said Solution C was 60:40.

Example 4

Similarly to Example 1 except that the powder of apatite-coated titanium dioxide photocatalyst was 2.03 g, Solution D was prepared, and Sample d of Example 4 was prepared. The ratio of vinyl chloride resin and acrylic resin to apatite-coated titanium dioxide in said Solution D was 40:60.

Example 5

Similarly to Example 1 except that the powder of apatite-coated titanium dioxide photocatalyst was 3.15 g, Solution E was prepared, and Sample e of Example 5 was prepared. The ratio of vinyl chloride resin and acrylic resin to apatite-coated titanium dioxide in said Solution E was 30:70.

Comparative Example 1

The sheet itself which was polyester fiber textile used in Example 1 both sides of which were coated with vinyl chloride resin without photocatalyst to be coated was adopted as Sample f of Comparative Example 1.

Comparative Example 2

Similarly to Example 1 except that the powder of anatase type titanium dioxide photocatalyst (ISHIHARA SANGYO KAISHA, Ltd., ST01, primary particle diameter about 7 nm) not coated with apatite was 0.15 g to prepare Solution G, and Sample g of Comparative Example 2 was prepared. The ratio of vinyl chloride resin and acrylic resin to titanium dioxide not coated with apatite in said Solution G was 90:10.

Comparative Example 3

Similarly to Example 1 except that the powder of titanium dioxide photocatalyst not coated with apatite of Comparative Example 2 was 0.34 g to prepare Solution H, and Sample h of Comparative Example 3 was prepared. The ratio of vinyl chloride resin and acrylic resin to titanium dioxide not coated with apatite in said Solution H was 80:20.

Comparative Example 4

Similarly to Example 1 except that the powder of titanium dioxide photocatalyst not coated with apatite of Comparative Example 2 was 0.9 g to prepare Solution I, and Sample i of Comparative Example 4 was prepared. The ratio of vinyl chloride resin and acrylic resin to titanium dioxide not coated with apatite in said Solution I was 60:40.

Comparative Example 5

Similarly to Example 1 except that the powder of titanium dioxide photocatalyst not coated with apatite of Comparative Example 2 was 2.03 g to prepare Solution J, and Sample j of Comparative Example 5 was prepared. The ratio of vinyl chloride resin and acrylic resin to titanium dioxide not coated with apatite in said Solution J was 40:60.

Comparative Example 6

Similarly to Example 1 except that the powder of titanium dioxide photocatalyst not coated with apatite of Comparative Example 2 was 3.15 g to prepare Solution K, and Sample k of Comparative Example 6 was prepared. The ratio of vinyl chloride resin and acrylic resin to titanium dioxide not coated with apatite in said Solution K was 30:70.

Example 6

Next, Examples 6-10 and Comparative example 7 are explained for the photocatalyst sheet with the apatite-coated photocatalyst particles fixed on the surface of the sheet which is the glass fiber textile both sides of which are coated with PTFE.

An apatite-coated anatase type titanium dioxide photocatalyst aqueous dispersion (Showa Denko K. K., F1S02FS (average particle diameter 90 nm, apatite coating 2%, solid content 25 wt %)) 10 g, purified water 10 g, aqueous dispersion of FEP (solid content 54 wt %) 41.7 g and silicon surface active agent (1 wt % of total) 0.6 g were mixed and stirred to make Solution M (FEP/apatite-coated titanium dioxide=90/10).

Next, said Solution M was coated by bar coating on one side of the sheet made of glass fiber textile both sides of which were coated with PTFE, and further the outermost surface layers of which were coated with FEP. After drying this coat at ordinary temperature, it was thermally dried at 60 degrees centigrade for 5 minutes, further sintered at 360 degrees centigrade for 3 minutes, and spontaneously cooled. It was further irradiated by ultraviolet light (wavelength 300-400 nm) for 24 hours at irradiation intensity 180 $W/m^2$ as bleaching treatment using a low temperature cycle xenon weathermeter to prepare Sample m of Example 6.

Example 7

Similarly to Example 6 except that the aqueous dispersion of FEP was 18.5 g, Solution N was prepared, and Sample n of Example 7 was prepared. The ratio of FEP to apatite-coated titanium dioxide in said Solution N was 80:20.

Example 8

Similarly to Example 6 except that the aqueous dispersion of FEP was 6.9 g, Solution P was prepared, and Sample p of Example 8 was prepared. The ratio of FEP to apatite-coated titanium dioxide in said Solution P was 60:40.

Example 9

Similarly to Example 6 except that the aqueous dispersion of FEP was 3.1 g, Solution Q was prepared, and Sample q of Example 9 was prepared. The ratio of FEP to apatite-coated titanium dioxide in said Solution Q was 40:60.

Example 10

Similarly to Example 6 except that the aqueous dispersion of FEP was 2.0 g, Solution R was prepared, and Sample r of Example 10 was prepared. The ratio of FEP to apatite-coated titanium dioxide in said Solution R used here was 30:70.

Comparative Example 7

The sheet of PTFE of Example 6 the outermost surface layer of which was coated with FEP was ultraviolet-irradiated for 24 hours at irradiation intensity 180 $W/m^2$ (wavelength 300-400 nm) as bleaching treatment using a low temperature cycle xenon weathermeter to prepare Sample s of Comparative Example 7.

Next, the photocatalyst sheet containing apatite-coated titanium oxide photocatalyst of Examples 1-10 and the outermost layer of the sheets of Comparative Examples 1-7 were evaluated for photocatalytic activity, thermal adhesibility, and the mass change ratio by photoxidative decomposition.

FIG. 6 is the table showing the evaluation results of the PVC sheet of apatite-coated titanium oxide photocatalyst of Examples 1-5 and the outermost layer of Comparative Examples 1-6 for photocatalytic activity, thermal adhesibility, and the mass change ratio by photoxidative decomposition. The reductive function by photoxidative decomposition was evaluated by color difference (ΔE) after coloring reaction by silver nitrate aqueous solution. In the state of soaking of each sample into silver nitrate aqueous solution of 0.1 mol/liter (0.1 normal), if coloring reaction is recognized by one minute irradiation of ultraviolet light of 1 mW/cm$^2$, then it was defined as photocatalytically reactive and marked with ○, and if not, then marked with X.

As is obvious in the Evaluation 1 of FIG. 6, except for Comparative Example 1 that does not contain photocatalyst, all the photocatalyst sheets containing photocatalyst of Examples 1-6 and Comparative Examples 2-7 showed photocatalytic reaction, and hence marked with ○.

Next, thermal adhesion was conducted by thermal adhesion after overlapping the photocatalyst surfaces of PVC sheets. For thermal adhesion, a high frequency welder adherer (YAMAMOTO VINITA CO., LTD., YC-10000F, output 10 kW) provided with plate electrodes of 4 cm×30 cm (planar electrodes without concave and convex or tooth pattern) was used. The adhesive condition was designated current 90, designated velocity 10, synchronization 70, adhering time 4 seconds, and cooling time 3 seconds by which Sample f of Comparative Example 2 was fully adhered. After adhesion, the adhered parts were peeled off by a tensile tester at speed of 50 mm/minute, and the result of complete peeling from polyester or glass fiber was marked with ○ as good, the case that the appearance of peeling was such that a photocatalyst layer partly remained was marked with Δ, and the case of peeling between photocatalyst layers was marked with X judged as not adhered.

As is obvious from the Evaluation 2 of FIG. 6, the results of peeling test of Examples 1-3 and Comparative Examples 2-5 with apatite-coated titanium oxide photocatalyst were good (○), that of Example 4 was Δ, and in Example 5 and Comparative Examples 5 and 6, it resulted in non-adhesion (X). From these results, the ratios of vinyl chloride resin·acrylic resin to the apatite-coated titanium dioxide were from 40:60 to 90:10 for the photocatalyst sheets of Examples 1-4, which turned out to be good in thermal adhesibility.

Next, the mass change ratio by photocatalytic decomposition was evaluated. A test piece of 5 cm×5 cm was cut out from each sample, and its mass was measured by mg order. Thereafter, each test piece was set into a xenon lamp weathermeter (Suga Test Instruments Co., Ltd., irradiated wavelength 300-400 nm, intensity 18 mW/cm$^2$), and the masses after 1 hour and 24 hours irradiations were measured by mg order, and the mass change ratio from before test was calculated.

In case of a PVC sheet, evaporation of plasticizers or others occur particularly by the ultraviolet irradiation. The mass change ratio was defined as that of whole test piece sheet. Since special attention was paid to the mass change ratio near the photocatalyst-containing resin layer, it was defined as the mass change ratio to the coated amount (25 mg per 25 cm$^2$ test piece because it was designed in this case as about 10 g/m$^2$), and Comparative Example 1 was defined as standard to take into account the evaporated amount of plasticizers and others (See the Evaluation 3 in FIG. 6). Therefore, the larger this value (+), the more suppressed was considered evaporation of plasticizers by the effect of surface treatment agents of polyvinyl chloride resin and acrylic resin. On the other hand, the larger the minus value (−), the more it was judged to be influenced by decomposition by photocatalysts, and the smaller the value, the smaller was considered the influence of photocatalysts.

As is obvious from the Evaluation 3 of FIG. 6, the mass change ratio for Examples 1-5 containing the apatite-coated titanium oxide photocatalyst were +, and there turned out to be no influence by the photocatalyst. On the other hand in Comparative Examples 2-6, the mass change ratio were −, and it turned out to be influenced by decompostion by a photocatalyst.

Next, the evaluations are explained for photocatalytic activity, thermal adhesibility, and the mass change ratio by photoxidative decomposition of the outermost layer of the sheets of Examples 6-10 and Comparative Example 7.

FIG. 7 is a table showing the results of evaluation of photocatalytic activity, thermal adhesibility, and the mass change ratio by photoxidative decomposition of the PTFE sheet with the FEP layer containing the apatite-coated titanium oxide photocatalyst as the outermost layer of Examples 6-10 and of the outermost layer of Comparative Example 7. The method of evaluation is same as that in Examples 1-5 except for the thermal adhesion condition of PTFE sheets, so that explanation is skipped.

For thermal adhesibility of PTFE sheets, the outermost layers of samples were overlapped on one another, and a hot plate adherer provided with hot plates of 10 cm×40 cm (planar hot plates without concave and convex or tooth pattern) was used. The adhesive condition was temperature 370 degrees, pressure 0.78 kg/cm$^2$, adhering time 70 seconds, and cooling time 20 seconds by which Comparative Example 7 (Sample s) was fully adhered.

As is obvious from the Evaluation 1 of FIG. 7, the photocatalyst sheets containing photocatalysts of Examples 5-10, except for Comparative Example 7 not containing the photocatalyst, were photocatalytically reactive and marked as ○.

From the Evaluation 2 of FIG. 7, it turned out that thermal adhesibility was such that the tensile tests of Examples 5-9 containing apatite-coated titanium oxide photocatalysts and Comparative example 7 with a sheet of PTFE only were good (○) or fair (Δ), and in Example 10 it could not be adhered (X). From these results, the ratios of FEP to the apatite-coated titanium dioxide were from 40:60 to 90:10 for the photocatalyst sheets of Examples 6-9, which turned out to be good in thermal adhesibility.

Further as is obvious from the Evaluation 3 of FIG. 7, it turned out that the mass change and its ratio of Examples 6-10 and Comparative Example 7 were 0 in all cases, and no influence by photocatalysts was observed.

From the results of the above-mentioned examples, it turned out that, in case of Examples 1-10, the mass change ratio by the photocatalytic activity of their outermost layers and by photoxidative decomposition was better than Comparative Examples 1-7. Also, particularly in Examples 1-4 and 6-9, the thermal adhesibility was furthermore better.

The present invention is not limited by the best modes described above for carrying out the invention, and it is needless to state that technological variations are possible within the range of the invention described in the claim, and these variations are also included in the claim. Here, in the present specification and claims, the term "sheet" is used, such as the photocatalyst sheet, and said sheet is meant to include film, too.

INDUSTRIAL APPLICABILITY

According to the photocatalyst sheet and methods of manufacturing the same of the present invention, the mutually weldable photocatalyst sheet can be easily obtained. Since also apatite-coated photocatalyst particles are dispersed and fixed in the photocatalyst-containing layer, the substrate is hardly decomposed by photo-redox reaction caused by the action of the photocatalyst. Since also the material weldable by mutual melting and solidifying is present on the surface of the photocatalyst-containing layer, pre-treatment is no longer necessary upon welding unlike prior arts. Especially, as in the third aspect of photocatalyst sheets of the present invention, the photocatalyst-containing layer can be made thin, thereby the quantity of the apatite-coated photocatalyst particles can be remarkably reduced by inserting the first coated layer made with the material identical with the photocatalyst-containing layer excluding photocatalysts between the second coated layer as the photocatalyst-containing layer and the substrate. Still also, by using the apatite-coated photocatalyst particles as the photocatalyst particles, it is not necessary to use such difficultly decomposable material as fluorocarbon resins upon fixing the apatite-coated photocatalyst particles, thereby the cost is not high and processing is not difficult. Here, it is applicable to fix the apatite-coated photocatalyst particles with a fluorocarbon resin. Especially, by adopting as photocatalyst particles the visible light responsive type, not only the ultraviolet light responsive type, the function as photocatalysts can be attained by indoor lighting. Also by making the ratio of the apatite-coated photocatalyst particles to resin or rubber 10-90 weight %, the resin, rubber, or a substrate are not deteriorated, and the functional effect of photocatalyst can be fully attained.

Further, by methods of welding of photocatalyst sheets of the present invention, the apatite-coated photocatalyst particles are dispersed and fixed in the photocatalyst-containing layer, and preferably also on its surface. Therefore, since the resin as its fixing agent is also present on the surface, the photocatalyst-containing layer of the photocatalyst sheet are mutually melted and solidified, thereby both photocatalyst sheets can be mutually welded by either adhering both photocatalyst sheets with an adhesive or a double-stick tape or by thermal treatment. Therefore, the pre-treatment to partially remove an intermediate layer and a photocatalyst layer is no longer necessary upon welding unlike prior arts. Thereby welding work is remarkably shortened. Further in case of thermal welding, sufficient weld strength can be attained upon welding of photocatalyst sheets by making the ratio of the apatite-coated photocatalyst particles to resin or rubber 10-60 weight %.

The photocatalyst sheet of the present invention is used for film/fabric structures such as domes and others, tents, interior materials, flexible container bags, and the sheets for civil engineering, and the method of welding the photocatalyst sheets of the present invention is used for easily welding the sheets to variously desired sizes.

What is claimed is:

1. A photocatalyst sheet comprising:
   a substrate made of glass fiber,
   a coated layer made of polytetrafluoroethylene (PTFE) coated on both sides of said substrate, and
   a photocatalyst-containing layer coated on at least one side of said coated layer,
   wherein said photocatalyst-containing layer contains tetrafluoroethylene-hexa-fluoropropylene copolymer (FEP) and apatite-coated photocatalyst particles having low water solubility,
   said photocatalyst particles contain titanium oxide, and said apatite is either of apatite hydroxide, apatite carbonate, apatite fluoride, or apatite chloride, or a mixture thereof,
   the particle diameter of said photocatalyst particles is 1 nm to 100 nm,
   the ratio of said apatite-coated photocatalyst particles to said photocatalyst-containing layer is 10-40 weight %,
   the coating quantity of said apatite coated on said photocatalyst particles is such that the weight loss ratio of the whole of said photocatalyst sheet is 10% or less when ultraviolet light of intensity of 18 mW/cm$^2$ is irradiated for one hour on the surface of said photocatalyst sheet,
   the water contact angle of said photocatalyst sheet surface is 130 degrees or less,
   whereby said coated layer can be peeled from said substrate when a pair of said photocatalyst sheets are mutually thermally welded to form a welded part and when said welded part is peeled off by a peeling test at the rate of 50 mm/min.

2. The photocatalyst sheet as set forth in claim 1, characterized in that the apatite-coated photocatalyst particles fixed in said photocatalyst containing layer have parts exposed from the surface of said photocatalyst containing layer.

3. The photocatalyst sheet as set forth in claim 1, characterized in that said apatite-coated photocatalyst particles are the photocatalyst particles either a part of the surface of which is coated with apatite, or a whole surface of which is coated with porous apatite.

4. The photocatalyst sheet as set forth in claim 1, characterized in that said photocatalyst particles are either or both of an ultraviolet light responsive type and a visible light responsive type.

5. A photocatalyst sheet comprising two or more photocatalyst sheets mutually welded to each other, each of said two or more photocatalyst sheets comprising:
   a substrate made of glass fiber,
   a coated layer made of polytetrafluoroethylene (PTFE) coated on both sides of said substrate, and
   a photocatalyst-containing layer coated on at least one side of said coated layer,
   wherein said photocatalyst-containing layer contains tetrafluoroethylene-hexa-fluoropropylene copolymer (FEP) and apatite-coated photocatalyst particles having low water solubility,
   said photocatalyst particles contain titanium oxide, and said apatite is either of apatite hydroxide, apatite carbonate, apatite fluoride, or apatite chloride, or a mixture thereof,
   the particle diameter of said photocatalyst particles is 1 nm to 100 nm,
   the ratio of said apatite-coated photocatalyst particles to said photocatalyst-containing layer is 10-40 weight %,
   the coating quantity of said apatite coated on said photocatalyst particles is such that the weight loss ratio of the whole of said photocatalyst sheet is 10% or less when ultraviolet light of intensity of 18 mW/cm$^2$ is irradiated for one hour on the surface of said photocatalyst sheet,
   the water contact angle of said photocatalyst sheet surface is 130 degrees or less,
   whereby said coated layer can be peeled from said substrate when a pair of said photocatalyst sheets are mutually thermally welded to form a welded part and when said welded part is peeled off by a peeling test at the rate of 50 mm/min.

6. The photocatalyst sheet as set forth in claim 5, characterized in that the apatite-coated photocatalyst particles fixed in said photocatalyst containing layer have parts exposed from the surface of said photocatalyst containing layer.

7. The photocatalyst sheet as set forth in claim 5, characterized in that said apatite-coated photocatalyst particles are the photocatalyst particles either a part of the surface of which is coated with apatite, or a whole surface of which is coated with porous apatite.

8. The photocatalyst sheet as set forth in claim 5, characterized in that said photocatalyst particles are either or both of an ultraviolet light responsive type and a visible light responsive type.

* * * * *